(12) United States Patent
VandeGeijn (10) Patent No.: US 6,250,046 B1
(45) Date of Patent: Jun. 26, 2001

(54) COLLET CRIMPING HEAD

(76) Inventor: Peter T. VandeGeijn, 312 Buck Cash Rd., Westminster, MD (US) 21158

( * ) Notice: Subject to any disclaimer, the term of this patent is extended or adjusted under 35 U.S.C. 154(b) by 0 days.

(21) Appl. No.: 09/302,664

(22) Filed: Apr. 30, 1999

Related U.S. Application Data (63) Continuation-in-part of application No. 09/222,475, filed on Dec. 29, 1998, now Pat. No. 6,170,232.
(60) Provisional application No. 60/083,899, filed on May 1, 1998.

(51) Int. Cl.$^7$ .................................................. B65B 7/28
(52) U.S. Cl. ............................ 53/317; 53/331.5; 53/351; 53/356
(58) Field of Search .................................. 53/331.5, 348, 53/351, 356

(56) References Cited

U.S. PATENT DOCUMENTS

| | | | |
|---|---|---|---|
| 894,797 | * 7/1908 | Levey | 53/356 |
| 946,138 | * 1/1910 | Kirkegaard | 53/351 |
| 997,142 | * 7/1911 | Levey | 53/356 |
| 1,779,593 | * 10/1930 | Goodwin | 53/356 |
| 2,670,118 | * 2/1954 | Young | 53/356 |
| 2,815,630 | * 12/1957 | Tonna | 53/356 |
| 4,621,481 | * 11/1986 | Magnusson | 53/356 |
| 5,884,450 | * 3/1999 | Ranchi | 53/331.5 |

* cited by examiner

*Primary Examiner*—John Sipos
(74) *Attorney, Agent, or Firm*—Law Offices of Royal W. Craig (57) ABSTRACT

An improved collet crimping head used with an existing single lane capping apparatus and collet chuck for gripping, installing and crimping pharmaceutical over-caps and the like during the automated high-volume filling and capping process. The collet crimping head is a unitary member formed with a lower cap crimping section and an upper mounting collar for attachment to a chuck of said automatic capping assembly. The lower cap crimping section has an inwardly directed and constrictable crimping collar for crimping and sealing aluminum hoods of said over-caps onto the necks of containers. The collet crimping head has a slim profile for low inertia, and it incorporates a simplified design for increased durability and reliability, lower manufacturing cost, and greater ease of handling.

4 Claims, 8 Drawing Sheets

COLLET CRIMPING HEAD

CROSS-REFERENCE TO RELATED APPLICATIONS

The present application is based on U.S. Provisional Patent Application 60/083,899 entitled "COLLET CRIMPING HEAD", filed May 1, 1998, and is a continuation-in-part of U.S. patent application Ser. No. 09/222,475 entitled "QUICK-CHANGE COLLET CHUCK", filed Dec. 29, 1998, now U.S. Pat. No. 6,170,232.

BACKGROUND OF THE INVENTION

1. Field of the Invention

The present invention relates to automated machinery for crimping caps onto containers and, more particularly, to a collet crimping head for gripping, installing and crimping container caps onto containers during an automated high-volume filling and capping process.

2. Description of the Background

The filling and capping process generally entails supplying containers along a conveyor, automatically filling them at a filling station, and automatically capping them at a capping station. Various testing and control functions may be performed along the way, e.g., testing and control of fill volume, conveyor velocity, etc. The apparatus which performs the process must be capable of accommodating a wide variety of containers and caps (both caps and containers may vary in size and shape), and this is accomplished by a universal chuck which allows quick and easy grasping and manipulation of different cap sizes.

In U.S. patent application Ser. No. 09/222,475 entitled "QUICK-CHANGE COLLET CHUCK", filed Dec. 29, 1998, the inventor herein explained that many caps are intended for screw-insertion onto containers, and a variety of automated collet chucks exist for positioning and torquing of such caps. The above-referenced application describes how a low-inertia collet-type chuck which has proven itself far superior to conventional Donut Chucks and the Segmented Jaw Chucks. This is in part because the collet design has a much broader operative range. In addition, the disclosed collet chuck offers a quick-change feature for quick and effortless swapping out of different size jaw sets for different size caps. The collet itself is a low cost one-piece component with a number of downwardly protruding tines for gripping a cap. The collet may have urethane-lined jaws to drive caps with lower torque requirements, or machined contact is profile jaws to drive caps with high torque requirements (positive interlocking with the external cap profile). Given either arrangement, even asymmetric caps can be clamped into the collet without requiring a special chuck change (collet orientation relative to the chuck is always an exact repeat and servo drive allows an exact chuck orientation repeat). There is virtually no down time (or skill level) associated with the collet change.

Figure 1:
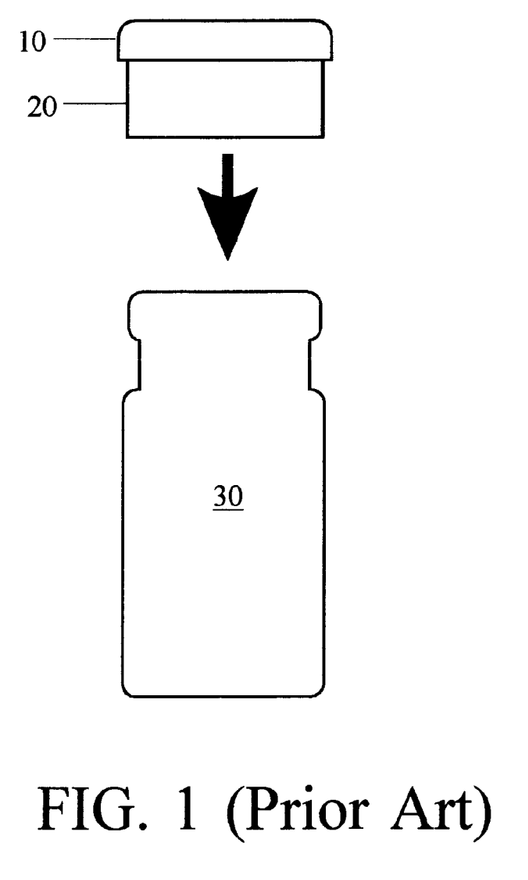
FIG. 1 is a front view of a pharmaceutical vial 30 with a conventional read seal over-cap including plastic cap 10 and aluminum hood 20.
Figure 2:
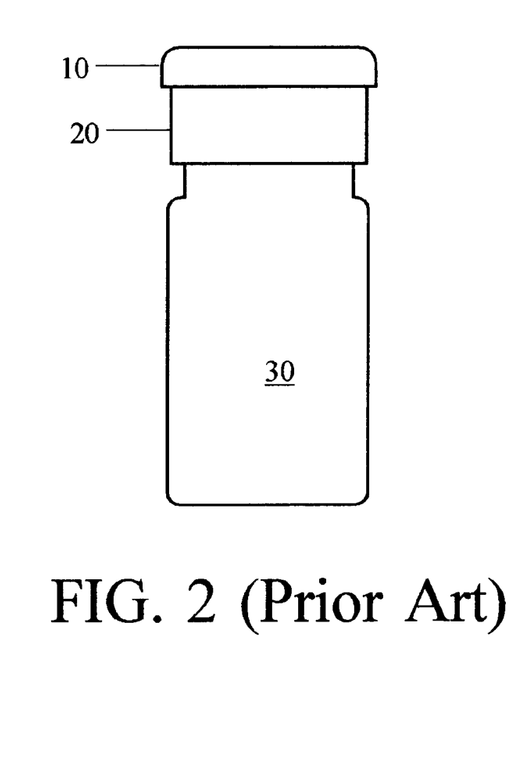
FIG. 2 is a front view of the pharmaceutical vial 30 of FIG. 1 with read seal over-cap in place but unsealed.
Figure 3:
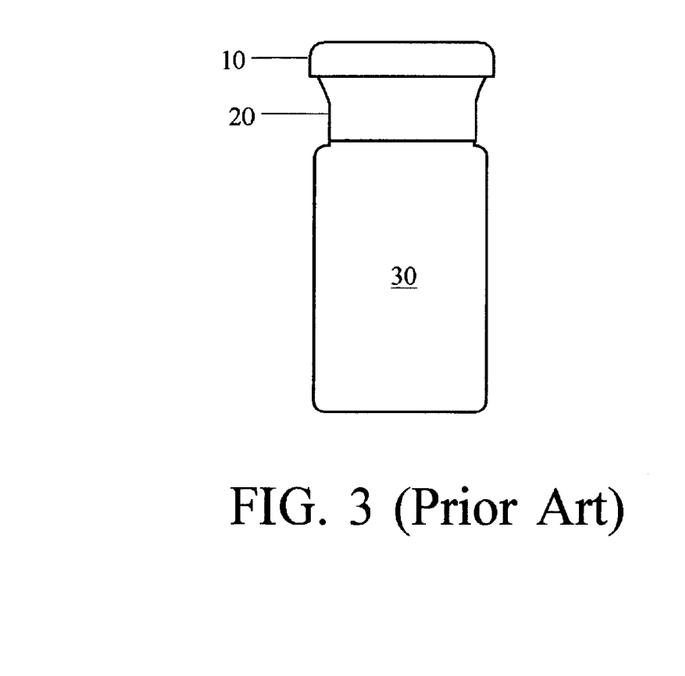
FIG. 3 is a front view of the pharmaceutical vial 30 of FIGS. 1–2 with read seal over-cap in place and sealed by crimping of the aluminum hood 20.

The above-described collet chuck was designed for caps that require screw-insertion onto containers. However, many other caps are crimped onto containers. FIGS. 1–3 generally illustrate the crimping process.

FIG. 1 is a front view of a pharmaceutical vial 30 with a conventional read seal over-cap including plastic cap 10 and aluminum hood 20. The crimping process begins vial 30 or other container formed with a neck, and a cap having a deformable aluminum hood 20 to be crimped around the neck of the vial 30. As is known in the art, plastic cap 10 is bonded to the hood 20 but can be removed to expose a sealed but penetrable opening through the hood and into the medicine in vial 30.

FIG. 2 is a front view of the pharmaceutical vial 30 of FIG. 1 with read seal over-cap in place but unsealed. The capping process entails placing the cap 10 and hood 20 onto the vial 30 as shown. Once fully installed, the aluminum hood 20 is crimped around the neck of the vial 30 to provide a fluid-tight seal.

FIG. 3 is a front view of the pharmaceutical vial 30 of FIGS. 1–2 with read seal over-cap in place and sealed by crimping of the aluminum hood 20.

It would be greatly advantageous to adapt the screw-cap collet chuck design as shown and described in the above-described U.S. patent application Ser. No. 09/222,475 entitled "QUICK-CHANGE COLLET CHUCK", filed Dec. 29, 1998, for use as a collet crimping head to allow crimping of hoods of over caps around the necks of containers such as vials in order to provide a fluid-tight seal.

SUMMARY OF THE INVENTION

It is, therefore, an object of the present invention to provide an improved collet crimping head for use in handling virtually any over-cap bottle seating.

It is still another object to provide a collet crimping head which incorporates a unitary crimping collet for increased durability and reliability, lower manufacturing cost, and greater ease of handling.

It is a further object to provide a crimping head as described above with the lowest inertia possible so as not to interfere with high speed operation.

It is another object to provide an optional quick-change ability for the above-described collet crimping head to enable quick and effortless no-tool swapping out of different size crimping heads for different size caps while minimizing any interruption of the container capping process.

Additional objects include stainless construction.

In accordance with the above objects, an improved collet crimping head is described for use in an existing single lane capping apparatus for gripping, crimping and sealing aluminum hoods of over-caps onto the necks of existing containers. The collet crimping head is a unitary member formed with an upper mounting collar for attachment to the chuck of the automatic capping assembly. The collet crimping head also has a lower cap crimping section including an inwardly directed and constrictable crimping collar for crimping and sealing aluminum hoods of said over-caps onto the necks of containers. The collet crimping head has a slim profile for low inertia and will not interfere with high speed operation.

An optional quick-change feature is also disclosed to allow quick and effortless swapping out of different size crimping collets for different size caps while minimizing interruption and down time of the automated container capping processes.

The collet crimping head of the present invention was specifically developed for cap positioning and crimping of pharmaceutical containers, although it should be understood that the inventive concept may apply in many other crimping contexts.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The crimping head of the present invention is designed for use in an existing single lane capping apparatus chuck substantially as shown and described in parent application Ser. No. 09/222,475 entitled "QUICK-CHANGE COLLET CHUCK", filed Dec. 29, 1998. However, rather than screw-caps, the crimping head is designed for inserting and crimping conventional over-caps onto containers as shown in FIGS. 1–3.

Figure 4:
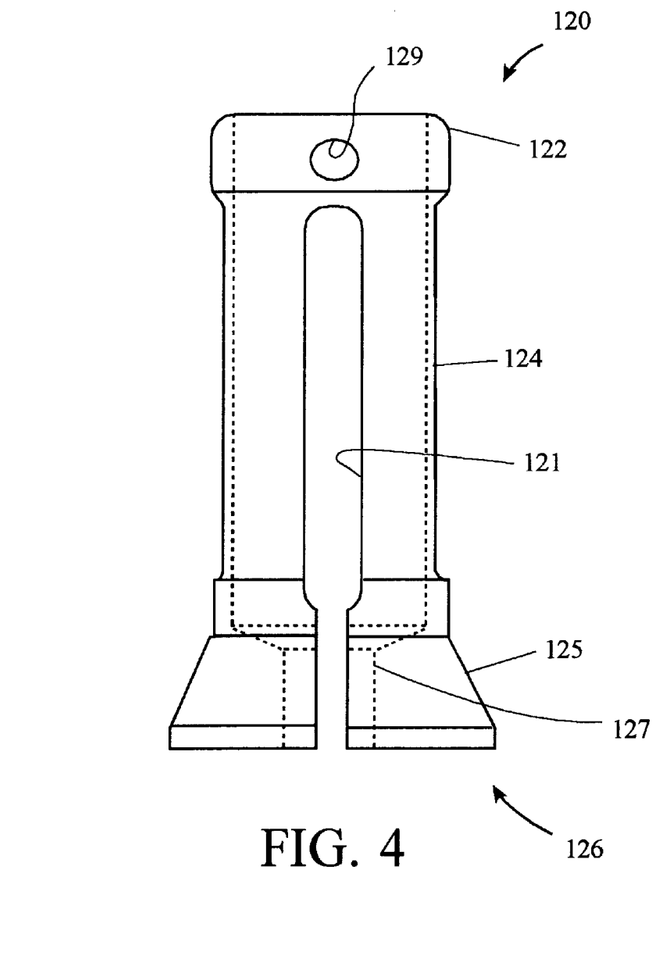
FIG. 4 is a side sectional view of a crimping collet 120 according to one embodiment of the present invention.

FIG. 4 is a side sectional view of a crimping collet 120 according to one embodiment of the present invention. The crimping collet 120 is a generally cylindrical unitary member formed with an upper mounting collar 122, a downwardly extending mid section 124, and a lower cap gripping/crimping section 126. The downwardly extending mid section 124 has an angled step 125 toward the bottom.

The upper mounting collar 122 of crimping collet 120 is machined with a transverse through-bore 129 to receive a pin 105 as will be described.

The crimping head 120 is formed with a generally hollow interior, and the interior surface of the lower cap gripping/crimping section 126 is formed with a constricted crimping collar 127.

The downwardly extending mid section 124 and lower cap gripping/crimping section 126 are interrupted by a plurality of longitudinal axial notches 121 which define tines that give the cap gripping/crimping section 126 the ability to expand or contract to release/grip and crimp an over-cap inserted therein. Presently, four notches 121 spaced uniformly and radially about the crimping head 120 are preferred (thereby giving four tines), each terminating below the mounting collar 122 and extending through the cap gripping/crimping section 126.

The crimping collet 120 of FIG. 4 fits into a chuck substantially as shown in parent in application Ser. No. 09/222,475, with slight modifications to effect a proper crimping operation.

Figure 5:
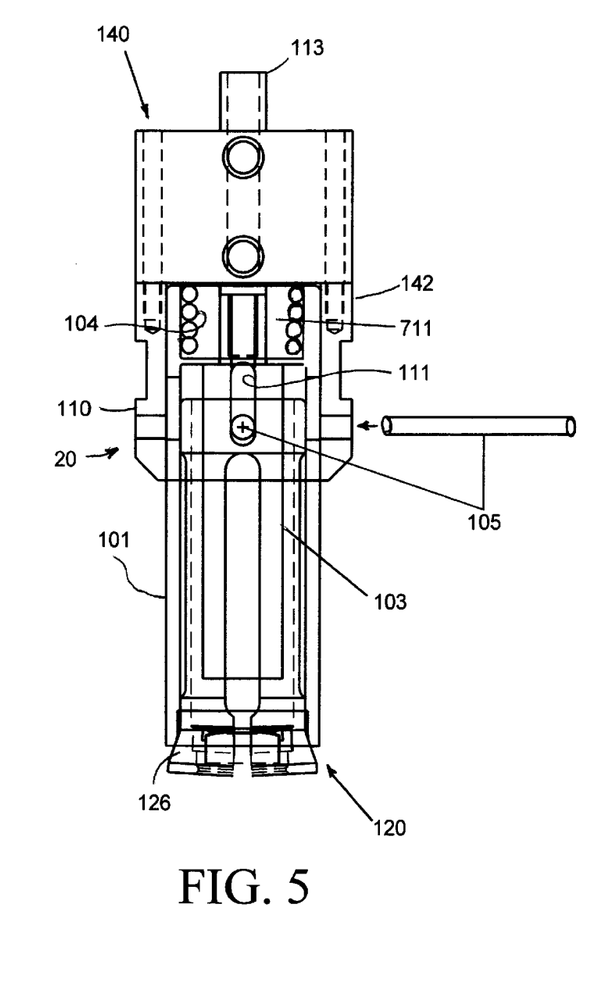
FIG. 5 is a side sectional view of the modified chuck assembly similar to that set forth in parent application Ser. No. 09/222,475 entitled "QUICK-CHANGE COLLET CHUCK", filed Dec. 29, 1998, with crimping collet head 120 inserted therein.

FIG. 5 is a side sectional view of the modified collet chuck 20 with crimping collet 120 inserted therein.

The collet chuck 20 is secured to the existing mounting block 140 of the capping apparatus, and a drive shaft 113 as supplied with the existing capping apparatus 10 is shown protruding into the collet chuck 20.

The collet chuck 20 consists of a crimping head housing 142 that is secured to the existing mounting block 140 of the capping apparatus, and a shaft 103 that passes through crimping head housing 142 and that connects with the hollow drive shaft 113 supplied with the existing capping apparatus 10.

The crimping head housing 142 is machined toward its lower extremity with a through-bore 110 to receive a pin 105 as shown. Shaft 103 is machined toward its upper extremity with an oblong through-bore 111 to receive pin 105. Pin 105 fits tightly into the through-bore 110 in crimping head housing 142 and loosely through a cylindrical sleeve 101 (to be described) as well as the oblong through-bore 111 in shaft 103 in a slidable manner. In this manner, crimping collet 120 may be inserted over the end of shaft 103 and captured by pin 105, thereby retaining the crimping collet 120 with a slidable degree of freedom.

Figure 7:
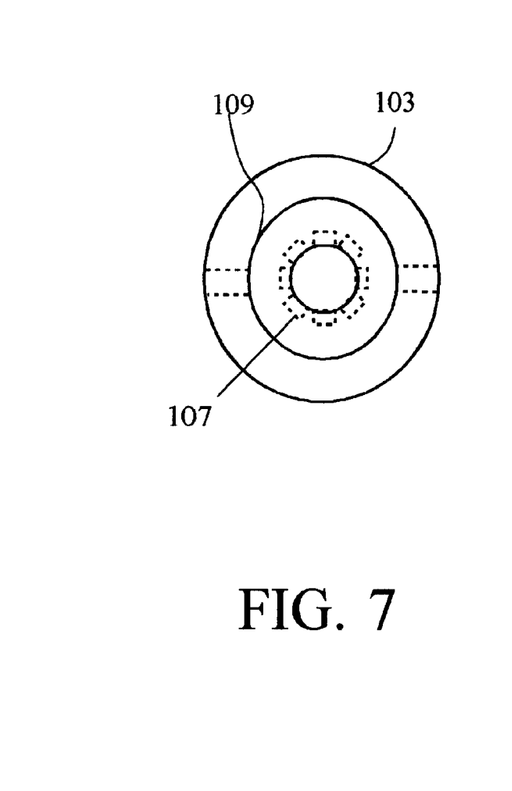
FIGS. 7 and 8 are an end view and a side cross-section, respectively of the shaft 103 of FIGS. 5 and 6.
Figure 8:
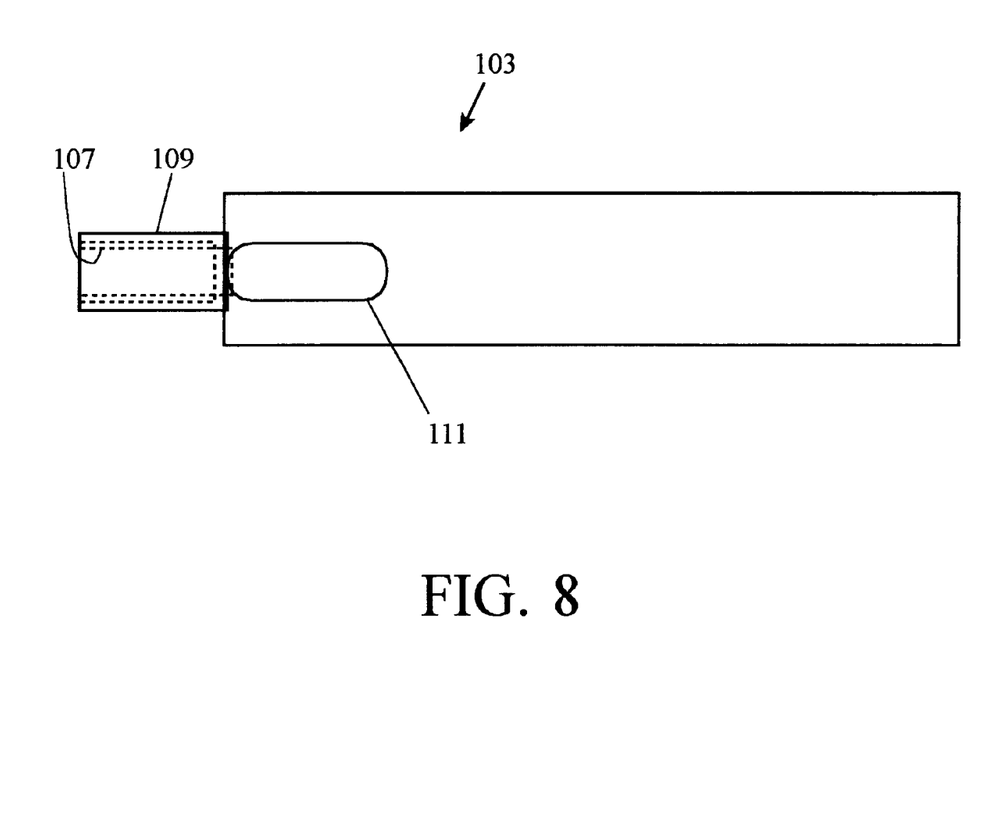
Figure 9:
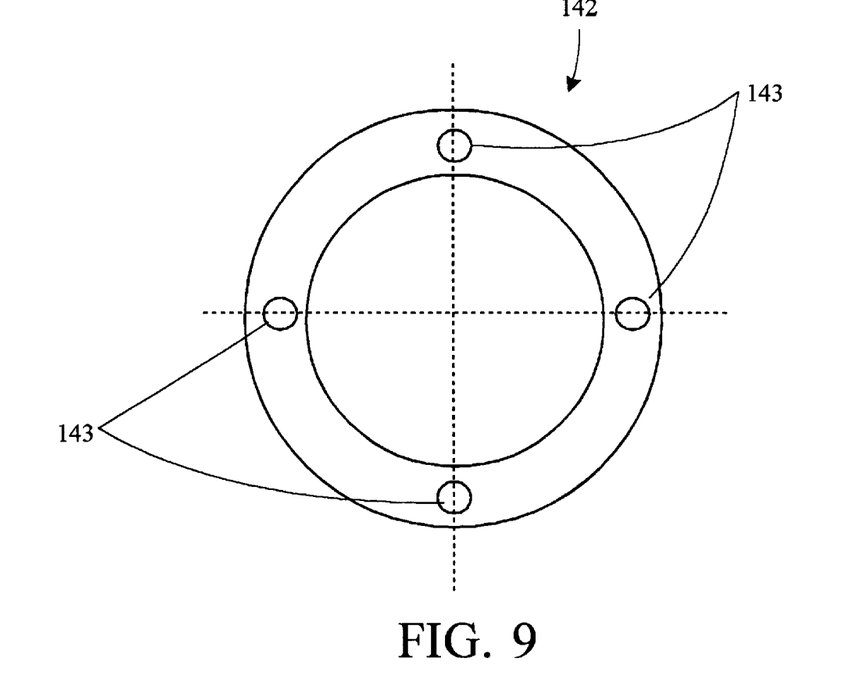
FIGS. 9, 10, 11 and 12 are an end view, a side cross-section, a side cross-section rotated by 90 degrees, and an opposing end view, respectively, of the crimping head housing 142 of FIGS. 5 and 6..
Figure 10:
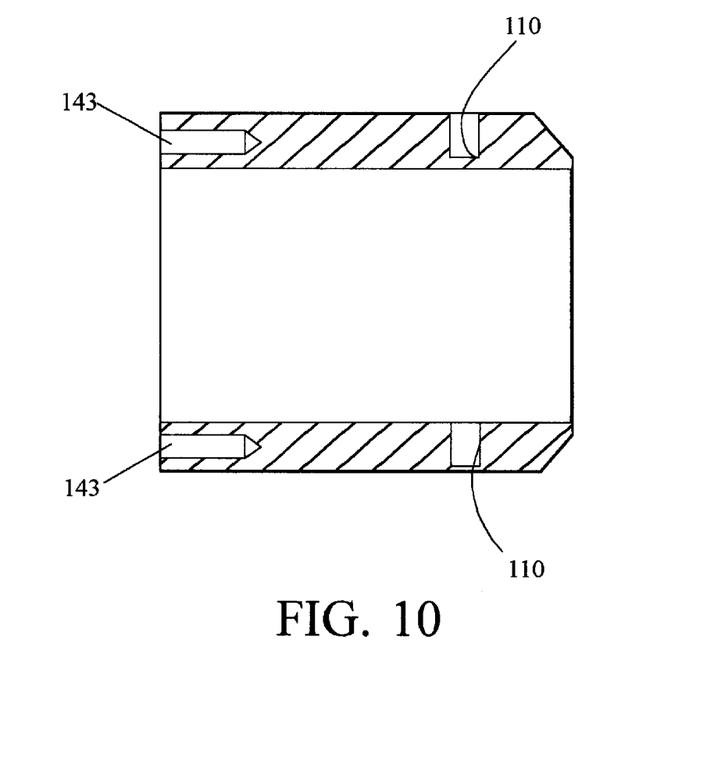
Figure 11:
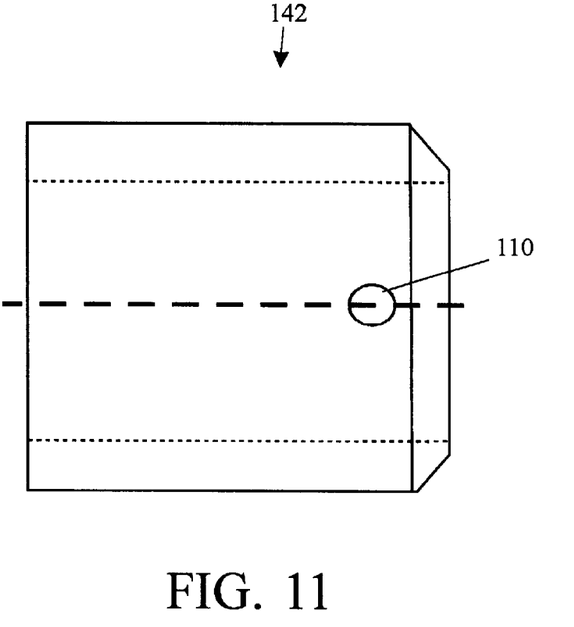
Figure 12:
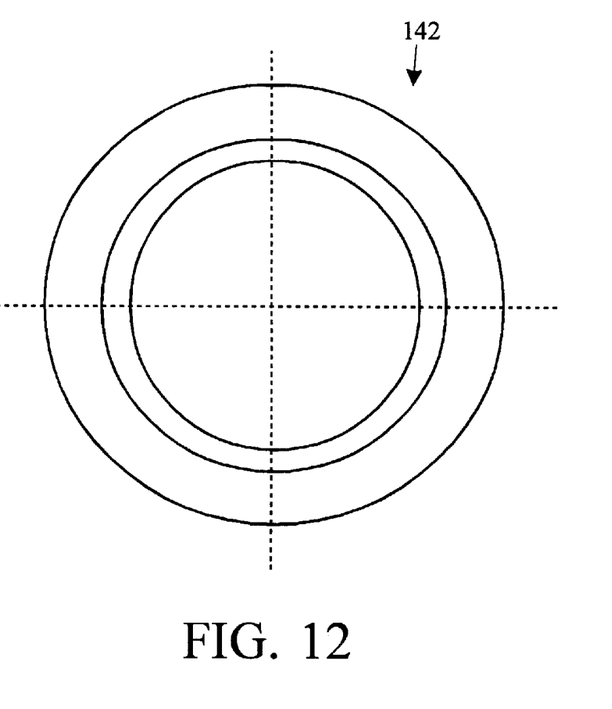

FIGS. 7 and 8 are an end view and a side cross-section, respectively of the shaft 103. Shaft 103 is a substantially cylindrical member that is formed with a tip 109 having a threaded bore 107 for coupling to the hollow drive shaft 113 supplied with the existing capping apparatus 10. Shaft 103 is shown with an oblong through-bore 111 for slidably receiving pin 105.

Referring back to FIG. 5, and as shown and described in parent application Ser. No. 09/222,475, an air supply is directed through side ports into an internal cavity of the mounting block 140. The crimping head housing 142 is secured by machine screws or the like to the underside of the existing mounting block 140 of the capping apparatus. The crimping head housing 142 is open at both ends and defines an internal sliding surface for cylindrical sleeve 101 (to be described).

FIGS. 9, 10, 11 and 12 are an end view, a side cross-section, a side cross-section rotated by 90 degrees, and an opposing end view, respectively, of the crimping head housing 142. The crimping head housing 142 is a generally annular hollow member formed with a plurality of set screw holes 143 spaced radially around one end as required for connection to the existing capping apparatus. The crimping head housing 142 is machined toward its lower extremity with a through-bore 110 to receive the pin 105 (of FIG. 5). Through-bore 110 is dimensioned to retain pin 105 tightly therein.

Figure 13:
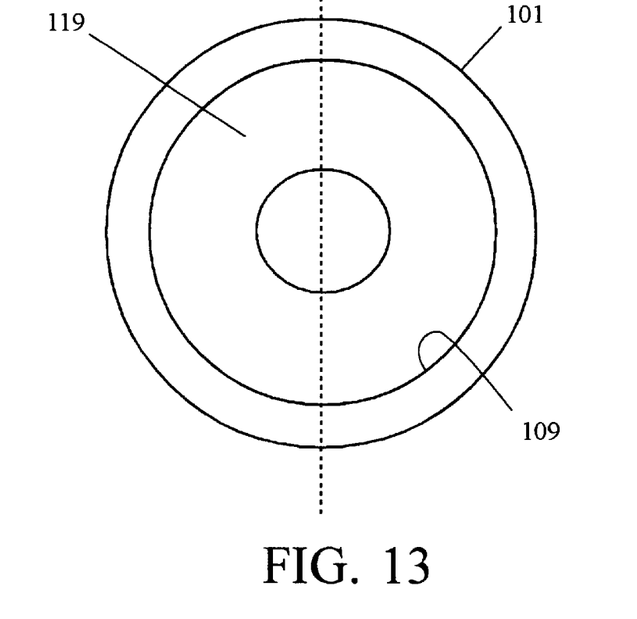
FIGS. 13, 14 and 15 are an end view, a side cross-section, and side cross-section rotated by 90 degrees, respectively, of the cylindrical sleeve 101 of FIGS. 5 and 6.
Figure 14:
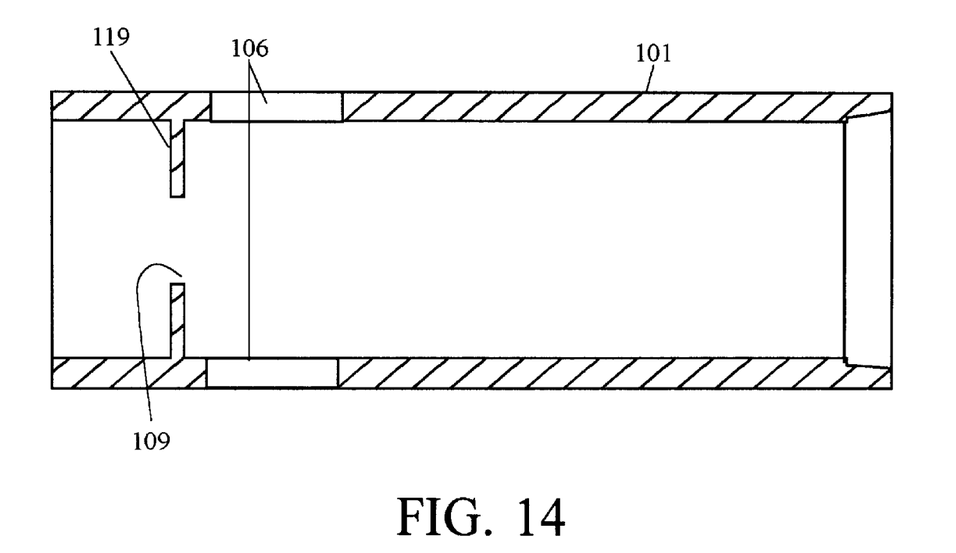
Figure 15:
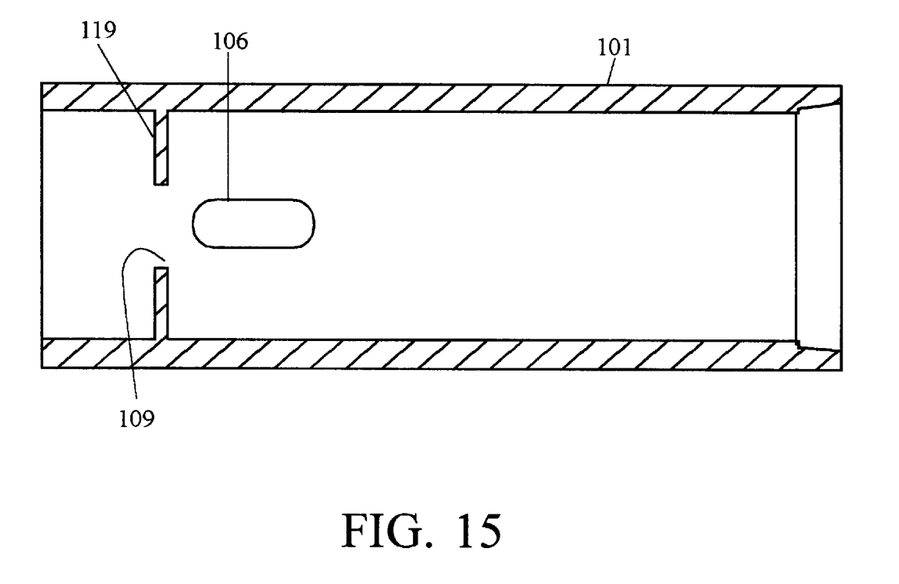

FIGS. 13, 14 and 15 are an end view, a side cross-section, and side cross-section rotated by 90 degrees, respectively, of the cylindrical sleeve 101. Cylindrical sleeve 101 is a unitary generally tubular cylindrical member having a recessed partition 119 substantially closing one end. Partition 119 is defined by a central aperture 109 for passing the shaft 103 that connects with the hollow drive shaft 113 supplied with the existing capping apparatus 10.

The recess defined by partition 119 of cylindrical sleeve 101 serves to retain a compression spring 104 that is required for return of the cylindrical sleeve 101 (after the air pressure is removed). Compression spring 104 is a conventional steel spring that, when seated, bears against the upper portion 140A of the crimping head housing.

As seen in FIG. 15, the cylindrical sleeve is also machined with an oblong through-bore 106 below the partition 119, and pin 105 (of FIG. 5) fits through this oblong through-bore 106 in a slidable manner.

The crimping collet 120 of FIG. 4 fits into the cylindrical sleeve 101 in close conformity with both the mounting collar 122 and flat portion directly above the angled step 125 (toward the bottom). This supports the crimping collet 120 yet leaves it free to slide within the cylindrical sleeve 101. Shaft 103 protrudes downward through the crimping collet 120 until its oblong through-bore 111 is aligned with the through-bores 106, 129, and 110 in cylindrical sleeve 101, crimping collet 120, and crimping head housing 142, respectively. Again, pin 105 fits loosely through oblong through-bores 106 and 111 in shaft 103 and cylindrical sleeve 101, respectively in a slidable manner. The lengthwise extent of the oblong through-bores 106 and 111 in shaft 103 and cylindrical sleeve 101, respectively, can be chosen to limit the downward actuation of cylindrical sleeve 101. On the other hand, pin 105 fits tightly through the through-bores 129 and 110 in crimping collet 120, and crimping head housing 142, respectively. This effectively fixes the position of the crimping collet 120 with respect to crimping head housing 142.

In operation, the crimping collet 120 is positioned over a container 30 (as in FIG. 1) with over-cap (comprising plastic cap 20 and aluminum hood 30) as yet unsealed but lightly seated within the interior surface of the lower cap gripping/crimping section 126. Air is supplied through side ports into the internal cavity of the sealed crimping head housing 140. The cavity 711 is pressurized and shaft 103 is urged downward. The bias of spring 104 forces cylindrical sleeve 101 to follow.

Figure 6:
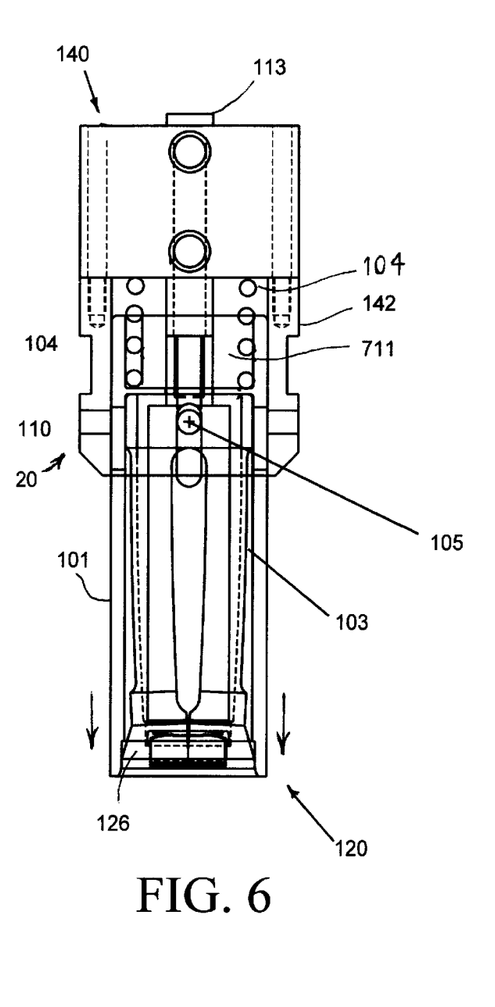
FIG. 6 is a side sectional view of the modified chuck assembly as in FIG. 5 with the crimping collar 126 of crimping collet head 120 shown constricted.

FIG. 6 is a side sectional view of the crimping collet 120 of FIG. 5 inserted into the quick-change chuck assembly described above. The action of the crimping collet 120 is as follows. As the shaft 103 is forced down, the spring 104 forces the cylindrical sleeve 101 to follow. Cylindrical sleeve 101 is biased downward until it encounters the angled step (or ramped bearing surface) 125 toward the bottom of the crimping collet 120. The annular lower lip of the Cylindrical sleeve 101 bears against the ramped bearing surface 125 of the crimping collet 120. As the Cylindrical sleeve 101 is forced down, the inner face of the Cylindrical sleeve 101 forces the lower cap gripping/crimping section 126 of the crimping collet 120 to flex inward (contract) and finally lock closed. The constricted (locked) crimping collar 127 around the interior surface of the lower cap gripping/crimping section 126 forms a continuous radial die surface. As the shaft 103 continues its travel, it seals the aluminum hood 20 by swaging it between the closed continuous die surface formed by the constricted (locked) crimping collar 127 of the crimping collet 120 and its own the contact surface, thereby sealing the aluminum hood 20 of the over-cap onto the neck of the container 30. Once the air pressure is released, the shaft 103 is retracted. Once the shoulder of the shaft 103 (formed by the tip 109) hits the cylindrical sleeve 101, cylindrical sleeve 101 is retracted thereby compressing spring 104. The crimping collet 120 is allowed to flex open again as the sleeve retracts off the flared mid section of crimping collet 120.

It is noteworthy that pin 105 may be a readily removable detent pin to allow quick-change tool-less swapping out of different collet crimping heads 120 for different size caps while minimizing interruption and down time of the automated container capping processes. Alternatively, an equivalent quick-change feature may be accomplished by forming the mounting collar 122 of crimping collet 120 with a hooked channel as shown and described in parent application Ser. No. 09/222,475 entitled "QUICK-CHANGE COLLET CHUCK", filed Dec. 29, 1998, the contents of said disclosure being incorporated herein by reference.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

I claim:

1. A crimping collet in combination with an automatic capping assembly, the automatic capping assembly having a chuck including a shaft for mounting said crimping collet to crimp and seal aluminum hoods of over-caps onto the necks of existing containers, said crimping collet comprising a unitary member formed with a lower cap crimping section and an upper mounting collar for attachment to the chuck of said automatic capping assembly, said lower cap crimping section further comprising a plurality of downwardly extended gripping tines spaced by a plurality of longitudinal notches for giving the gripping tines an ability to flex together, the flexed-together gripping tines forming an inwardly directed continuous radial die surface about the aluminum hoods of said over-caps;

means for moving said crimping collet in two distinct movements to lock said collet onto said overcap and after locking on said overcap swaging said aluminum hoods of the overcaps by said continuous die surface of the locked gripping tines against the neck of the containers to form a circumferentially continuous hermatic seal.

2. The crimping collet according to claim 1, wherein said capping assembly comprises a movable cylindrical sleeve surrounding said gripping tines, said downwardly extended gripping tines are each formed with an outwardly exposed ramped bearing surface that, when engaged by said downwardly traveling cylindrical sleeve, are engaged by said cylindrical sleeve and are caused thereby to flex together to form said inwardly directed continuous radial die surface about the aluminum hoods of said over-caps.

3. A quick-release collet crimping assembly for use in an automatic capping assembly, the automatic capping assembly having a chuck including a shaft for mounting said collet crimping assembly, said collet crimping assembly comprising:

a crimping collet for crimping and sealing aluminum hoods of over-caps onto the necks of containers, said crimping collet comprising a unitary member formed with an upper mounting collar defined by a through-bore, and a lower cap crimping section comprising a plurality of downwardly extended gripping tines spaced by a plurality of longitudinal notches for giving the gripping tines an ability to flex together, the flexed-together gripping tines forming an inwardly directed continuous radial die surface about the aluminum hoods of said over-caps;

a shaft for connection at one end to the chuck of said automatic capping assembly for moving said crimping collet in two distinct movements to lock said collet onto said overcap and after locking on said overcap swaging said aluminum hoods of the overcaps by said continuous die surface of the locked gripping tines against the neck of the containers to form a circumferentially continuous hermatic seal, said shaft being defined by a traverse hole proximate a distal end for attachment to said through-bore of said collet; and a transverse pin for insertion through the through-bore in said upper mounting collar and through the hole in said shaft, thereby locking said crimping collet onto said shaft.

4. The quick release collet crimping assembly according to claim 3, wherein said capping assembly comprises a movable cylindrical sleeve surrounding said gripping tines, said downwardly extended gripping tines are formed with an outwardly exposed ramped bearing surface that, when engaged by said downwardly traveling cylindrical sleeve, is engaged by said cylindrical sleeve and are caused thereby to flex together to form said inwardly directed continuous radial die surface about the aluminum hoods of said overcaps.

* * * * *